United States Patent
Westerberg et al.

(10) Patent No.: US 10,103,821 B2
(45) Date of Patent: Oct. 16, 2018

(54) DETECTION OF SLEEPING CELLS IN A COMMUNICATION NETWORK

(71) Applicant: Telefonaktiebolaget LM Ericsson (publ), Stockholm (SE)

(72) Inventors: Magnus Westerberg, Sollentuna (SE); Tomas Lagerqvist, Stockholm (SE); Malin Ljungberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/525,483

(22) PCT Filed: Dec. 2, 2014

(86) PCT No.: PCT/SE2014/051431
§ 371 (c)(1),
(2) Date: May 9, 2017

(87) PCT Pub. No.: WO2016/089261
PCT Pub. Date: Jun. 9, 2016

(65) Prior Publication Data
US 2017/0331565 A1 Nov. 16, 2017

(51) Int. Cl.
*H04B 7/00* (2006.01)
*H04B 17/00* (2015.01)
(Continued)

(52) U.S. Cl.
CPC ........ *H04B 17/0085* (2013.01); *H04W 24/04* (2013.01); *H04W 24/08* (2013.01); *H04W 72/005* (2013.01)

(58) Field of Classification Search
CPC ............. H04W 24/10; H04W 28/0231; H04W 28/0247; H04W 16/24; H04W 36/0061
(Continued)

(56) References Cited

U.S. PATENT DOCUMENTS

2010/0188969 A1* 7/2010 Kim .................. H04W 72/1284
370/216
2010/0234006 A1* 9/2010 Vadlamudi ............ H04W 24/04
455/418

(Continued)

OTHER PUBLICATIONS

International Search Report and Written Opinion of International Application No. PCT/SE2014/051431, dated Aug. 18, 2015, 11 pages.
(Continued)

*Primary Examiner* — Simon Nguyen
(74) *Attorney, Agent, or Firm* — NDWE LLP

(57) ABSTRACT

A method performed in a cellular communication network for establishing that a first cell of said network is unable to receive uplink radio signals. The method comprises determining that no indicative radio message has been received from any radio device during a predetermined time period. In view of said determining, requesting a second cell, neighboring the first cell, to instruct at least one radio device, connected to said second cell and able to detect said first cell, to transmit a radio signal. The method may also comprise obtaining information about how to receive the radio signal. The method may also comprise determining that the radio signal was not successfully received by the first cell in accordance with the obtained information.

24 Claims, 5 Drawing Sheets

(51) Int. Cl.
*H04W 24/08* (2009.01)
*H04W 24/04* (2009.01)
*H04W 72/00* (2009.01)

(58) Field of Classification Search
USPC ....................................................... 455/517
See application file for complete search history.

(56) References Cited

U.S. PATENT DOCUMENTS

| | | | |
|---|---|---|---|
| 2010/0254274 A1 | 10/2010 | Westerberg et al. | |
| 2012/0315890 A1* | 12/2012 | Suzuki | H04W 24/10 455/422.1 |
| 2013/0053091 A1* | 2/2013 | Jorguseski | H04W 24/02 455/524 |
| 2013/0143550 A1 | 6/2013 | Ostrup et al. | |
| 2014/0043998 A1 | 2/2014 | Wang et al. | |
| 2014/0056243 A1* | 2/2014 | Pelletier | H04W 74/04 370/329 |
| 2015/0050934 A1* | 2/2015 | Jung | H04W 36/0083 455/437 |
| 2015/0146547 A1* | 5/2015 | Kapnadak | H04W 24/04 370/252 |
| 2015/0146692 A1* | 5/2015 | Yi | H04W 36/24 370/331 |
| 2016/0345250 A1* | 11/2016 | Agyapong | H04W 48/16 |
| 2017/0094655 A1* | 3/2017 | Dai | H04L 5/14 |
| 2017/0237463 A1* | 8/2017 | Zheng | H04B 1/7087 370/328 |
| 2017/0265241 A1* | 9/2017 | Fujishiro | H04W 76/025 |

OTHER PUBLICATIONS

International Preliminary Report on Patentability for Application No. PCT/SE2014/051431, dated Jun. 15, 2017, 9 pages.
Communication pursuant to Article 94(3) EPC, for European Application No. EP14824575.6, dated Jul. 30, 2018, 7 pages.

* cited by examiner

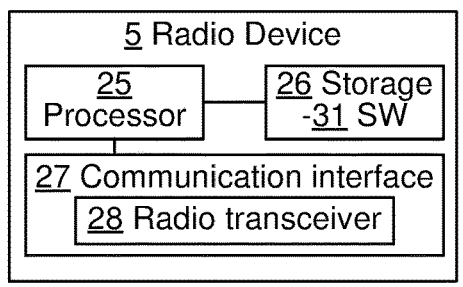
Fig. 2d
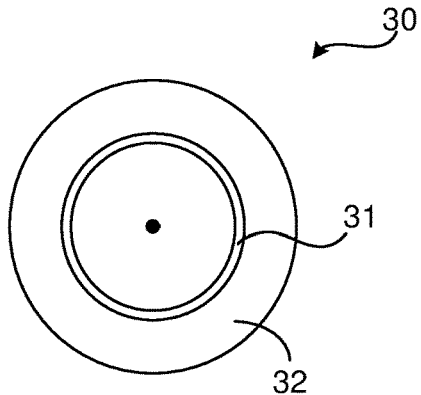
Fig. 3
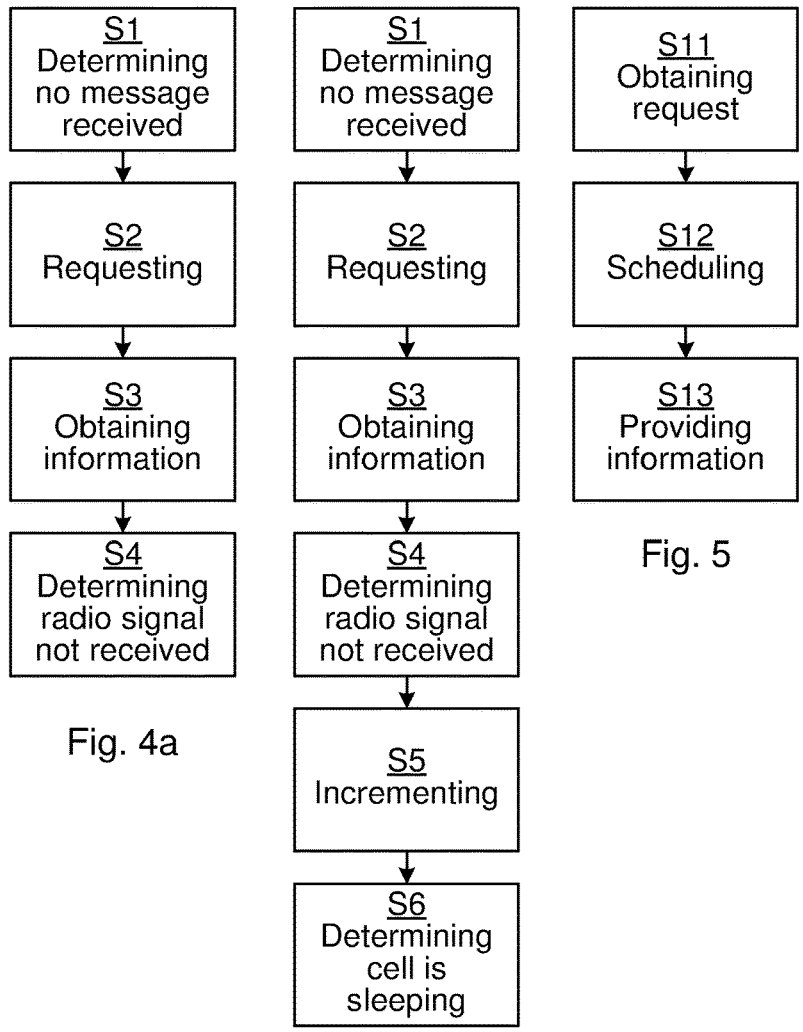
Fig. 4a
Fig. 4b
Fig. 5

DETECTION OF SLEEPING CELLS IN A COMMUNICATION NETWORK

CROSS-REFERENCE TO RELATED APPLICATIONS

This application is a National stage of International Application No. PCT/SE2014/051431, filed Dec. 2, 2014, which is hereby incorporated by reference.

TECHNICAL FIELD

The present disclosure relates to methods and devices for establishing that a cell of a cellular communication network is unable to receive uplink radio signals.

BACKGROUND

Sleeping cells are a special case of cell outage which makes mobile services unavailable for subscribers, while from the network point of view the network still appears to be operable. In this case, no service is provided to the end user, but no alarm is sent to the Operation and Maintenance Center (OMC) to indicate the problem.

Having sleeping cells in the network is a large problem for the network operator, since it can take a long time before the fault is detected. A thorough analysis of changes in traffic patterns over time may be needed in order to detect the malfunction. Such an analysis requires skilled personnel and takes time. Sleeping cells are thus costly for operators both because of the loss of revenue and because of the difficulty of detection. Furthermore the operator's reputation may be damaged if end users perceive the network as unreliable.

A common cause of sleeping cells is that the downlink (DL) transmissions fail, and in this area there are a number of existing strategies for detecting sleeping cells, such as using User Equipment (UE) measurements to detect sleeping cells e.g. Reference Signal Received Power (RSRP) and Reference Signal Received Quality (RSRQ) measurements that are collected from the UE and are fed to a centralized node to detect an outage of a cell.

In a more uncommon case, DL transmissions in the cell are still functional, but uplink (UL) reception fails. Normally, UL only failures are detected using statistical methods such as low wideband Received Signal Strength (RSS) measured by baseband.

Most of the existing solutions for detecting sleeping cells target the case when the DL transmission fails. They fail to address the case when DL transmission is unaffected, and the problem is in UL reception. Methods today for uplink failure are mostly statistical methods based on measured RSS. A drawback of these methods is that they are unreliable and time consuming.

SUMMARY

It is an objective of the present disclosure to provide an improved method of establishing that a cell of a cellular communication network is unable to receive uplink radio signals, possibly indicating a sleeping cell problem, thereby at least alleviating the problems with the prior art methods.

According to an aspect of the present disclosure, there is provided a method performed in a cellular communication network for establishing that a first cell of said network is unable to receive uplink radio signals. The method comprises determining that no indicative radio message has been received from any radio device during a predetermined time period. The method also comprises, in view of said determining, requesting a second cell, neighbouring the first cell, to instruct each of at least one radio device, connected to said second cell and able to detect said first cell, to transmit a radio signal. The method also comprises obtaining information about how to receive the radio signal. The method also comprises determining that the radio signal was not successfully received by the first cell in accordance with the obtained information.

According to another aspect of the present disclosure, there is provided a network node for a cellular communication network. The network node is configured for establishing that a first cell of said network is unable to receive uplink radio signals. The network node comprises processor circuitry, and a storage unit storing instructions executable by said processor circuitry whereby said network node is operative to determine that no indicative radio message has been received from any radio device during a predetermined time period. The network node is also operative to, in view of said determining, request a second cell, neighbouring the first cell, to instruct each of at least one radio device, connected to said second cell and able to detect said first cell, to transmit a radio signal. The network node is also operative to obtain information about how to receive the radio signal. The network node is also operative to determine that the radio signal was not successfully received by the first cell in accordance with the obtained information.

According to another aspect of the present disclosure, there is provided a method performed in a cellular communication network. The method comprises obtaining a request for a second cell, neighbouring a first cell, to instruct each of at least one radio device, connected to said second cell and able to detect said first cell, to transmit a radio signal. The method also comprises scheduling a radio device, connected to said second cell and able to detect said first cell, to transmit the radio signal using a set of scheduling parameters. The method also comprises providing information about how to receive the radio signal based on said set of scheduling parameters to a first base station providing the first cell.

According to another aspect of the present disclosure, there is provided a network node for a cellular communication network. The network node comprises processor circuitry, and a storage unit storing instructions executable by said processor circuitry whereby said network node is operative to obtain a request for a second cell, neighbouring a first cell, to instruct each of at least one radio device, connected to said second cell and able to detect said first cell, to transmit a radio signal. The network node is also operative to schedule a radio device, connected to said second cell and able to detect said first cell, to transmit the radio signal using a set of scheduling parameters. The network node is also operative to provide information about how to receive the radio signal based on said set of scheduling parameters to a first base station providing the first cell.

According to another aspect of the present disclosure, there is provided a computer program product comprising computer-executable components for causing a network node to perform an embodiment of a method of the present disclosure when the computer-executable components are run on processor circuitry comprised in the network node.

According to another aspect of the present disclosure, there is provided a computer program for establishing that a first cell of a cellular communication network is unable to receive uplink radio signals. The computer program comprises computer program code which is able to, when run on processor circuitry of a network node, cause the network node to determine that no indicative radio message has been received from any radio device during a predetermined time period. The code is also able to cause the network node to, in view of said determining, request a second cell, neighbouring the first cell, to instruct each of at least one radio device, connected to said second cell and able to detect said first cell, to transmit a radio signal. The code is also able to cause the network node to obtain information about how to receive the radio signal. The code is also able to cause the network node to determine that the radio signal was not successfully received by the first cell in accordance with the obtained information.

According to another aspect of the present disclosure, there is provided a computer program comprising computer program code which is able to, when run on processor circuitry of a network node in a cellular communication network, cause the network node to obtain a request for a second cell, neighbouring a first cell, to instruct each of at least one radio device, connected to said second cell and able to detect said first cell, to transmit a radio signal. The code is also able to cause the network node to schedule a radio device, connected to said second cell and able to detect said first cell, to transmit the radio signal using a set of scheduling parameters. The code is also able to cause the network node to provide information about how to receive the radio signal based on said set of scheduling parameters to a first base station providing the first cell.

According to another aspect of the present disclosure, there is provided a computer program product comprising an embodiment of a computer program of the present disclosure and a computer readable means on which the computer program is stored.

By using a known signal sent by a radio device connected to the second cell for determining whether the uplink receiver of the first cell is functioning, a faster and simpler way of establishing that the first cell is unable to receive UL radio signals or is sleeping is provided.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 2d is a schematic block diagram of an embodiment of a radio device in accordance with the present disclosure.

FIG. 3 is a schematic illustration of an embodiment of a computer program product in accordance with the present disclosure.

FIG. 4a is a schematic flow chart of an embodiment of a method performed by a NW node, in accordance with the present disclosure.

FIG. 4b is a schematic flow chart of another embodiment of a method performed by a NW node, in accordance with the present disclosure.

FIG. 5 is a schematic flow chart of another embodiment of a method performed by a NW node, in accordance with the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Embodiments of the present disclosure uses radio devices e.g. User Equipment (UE) in neighbouring cells to give feedback on the uplink connectivity in a potentially sleeping cell.

If a cell detects that it has not had any traffic for a time which is longer than a specified threshold it may trigger the algorithm for using UE measurements for detecting sleeping cells. This algorithm selects one of the neighbouring cells of the potentially sleeping cell, and send a request that this neighbour schedules a UE to make an uplink transmission. This scheduled uplink transmission may be called a probe transmission. Only UEs that report that they can detect the potentially sleeping cell are eligible for selection to do a probe transmission.

The neighbouring cell will send a response which contains information about how to decode the probe transmission, so that the potentially sleeping cell will have enough information to attempt decoding the transmission. If the potentially sleeping cell fails to decode the probe transmission, it may determine that it is sleeping or it may increase a counter. An alarm may be triggered in the sleeping cell when it has failed to decode such probe transmissions a sufficient number of times to reach a predetermined threshold for it to be regarded as sleeping.

The alarm from the sleeping cell may enable the network operator to take appropriate action to restore uplink functionality in the sleeping cell in a timely manner.

Sleeping cells are costly for operators since they are difficult to detect. To restore a sleeping cell often requires major interventions from skilled personnel. Sleeping cells also cause loss of revenue. On one hand, there will be less traffic since UEs cannot connect in a sleeping cell. On the other hand, sleeping cells will cause degradation in coverage which will decrease the end customer confidence in the overall quality of the operator's cellular network, which may lead to increased churn and additional loss of revenue. There is thus a need for a solution as provided herein, which provides an efficient way of detecting sleeping cells for the case when it is the uplink of the cell which is affected.

Figure 1:
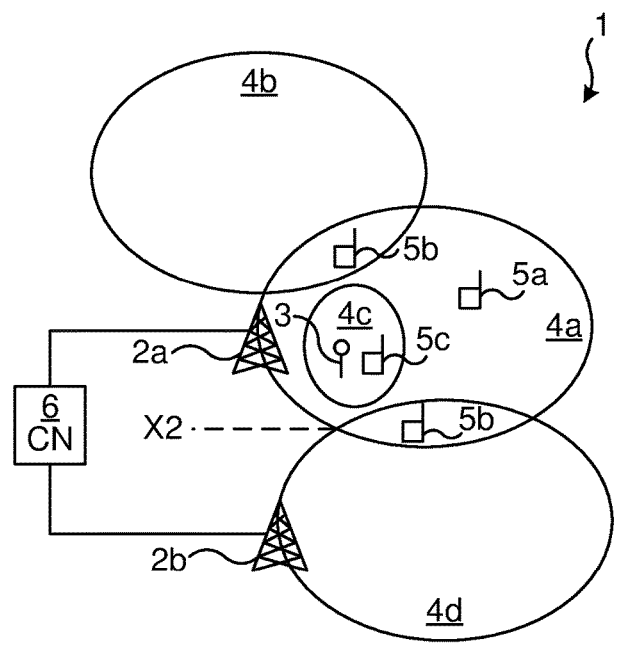
FIG. 1 is a schematic diagram of an embodiment of a cellular communication network in accordance with the present disclosure.

FIG. 1 is a schematic illustration of a cellular communication network 1 of the present disclosure. The network 1 comprises a Radio Access Network (RAN) comprising a plurality of network nodes 2 e.g. the base stations 2a and 2b of FIG. 1. The network also comprises a Core Network 6 with which the RAN is connected. The network may e.g. be in accordance with a Long Term Evolution (LTE) communication standard, in which case the base stations 2a and 2b each is an evolved Node B (eNB), which eNBs may communicate with each other over an X2 interface. Alternatively, the network may be in accordance with a Wideband Code Division Multiple Access (WCDMA) communication standard, in which case the base stations 2a and 2b each is a Node B (NB) and the RAN also comprises one or more Radio Network Controllers (RNC), not shown in the figure, as network nodes 2. The RAN nodes 2 provide a plurality of cells 4 of the network 1. In the example of FIG. 1, the first NW node 2a provides a first cell 4a, as well as a macro cell 4b and, via a remote radio head 3, a micro cell 4c. The second NW node 2b provides the cell 4d. All the cells 4b, 4c and 4d are neighbouring to, and partly overlaps, the first cell 4a. The RAN nodes 2 serve a plurality of radio devices 5. Some radio devices 5 which are within the geographical area nominally covered by the first cell 4a are depicted in FIG. 1. A first radio device 5a is covered by only the first cell 4a, a second radio device 5b is covered by both the first cell 4a and the macro cell 4b of the first NW node 2a, a third radio device 5c is covered both by the first cell 4a and by the micro cell 4c of the first NW node 2a, and a fourth radio device 5d is covered by both the first cell 4a and the cell 4d of the second NW node 2b. The situation illustrated in FIG. 1 would thus imply that if the first cell 4a is sleeping due to its uplink reception not working properly, the first radio device 5a would not be able to connect to the network 1, the second radio device 5b would connect to the network 1 via the macro cell 4b of the first NW node 2a, the third radio device 5c would connect to the network via the micro cell 4c and the fourth radio device 5d would connect to the network via the second NW node 2b cell 4d. However, all the radio devices 5a-d would be able to hear the first cell 4a and would have the first cell in their respective neighbour cell lists, but since the first cell 4a is not able to hear the radio devices 5, none of the radio devices 5 would be able to connect to the first cell 4a.

Figure 2A:
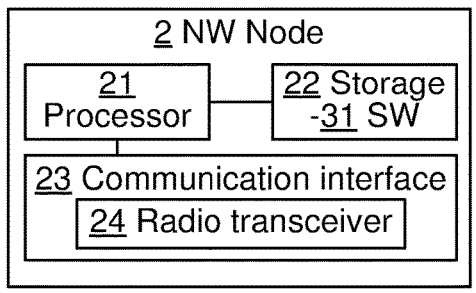
FIG. 2a is a schematic block diagram of an embodiment of a network (NW) node in accordance with the present disclosure.

FIG. 2a schematically illustrates an embodiment of a NW node 2 of the present disclosure. The NW node 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 31 (see also FIG. 3) stored in a storage 22 of one or several storage unit(s) e.g. a memory. The storage unit is regarded as a computer readable means 32 (see FIG. 3) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The NW node 2 also comprises a communication interface 23 for communication with other nodes in the network 1. The communication interface comprises a radio transceiver 24 for radio communication with radio devices 5 and, possibly, with other NW nodes 2. The radio transceiver comprises transmitter functionality as well as receiver functionality and is associated with an antenna for transmitting and receiving radio signals.

According to an aspect of the present disclosure, there is provided a network node 2 for a cellular communication network 1. The network node is configured for establishing that a first cell 4a of said network 1 is unable to receive uplink radio signals. The network node 2 comprises processor circuitry 21, and a storage unit 22 storing instructions 31 executable by said processor circuitry whereby said network node is operative to determine that no indicative radio message has been received from any radio device 5 during a predetermined time period. The network node is also operative to, in view of said determining, request a second cell 4b, 4c or 4d, neighbouring the first cell 4a, to instruct each of at least one radio device 5, connected to said second cell and able to detect said first cell, to transmit a radio signal. The network node is also operative to obtain information about how to receive the radio signal. The network node is also operative to determine that the radio signal was not successfully received by the first cell 4a in accordance with the obtained information.

According to another aspect of the present disclosure, there is provided a network node 2 for a cellular communication network 1. The network node comprises processor circuitry 21, and a storage unit 22 storing instructions 31 executable by said processor circuitry whereby said network node 2 is operative to obtain a request for a second cell 4b, 4c or 4d, neighbouring a first cell 4a, to instruct each of at least one radio device 5, connected to said second cell and able to detect said first cell, to transmit a radio signal. The network node is also operative to schedule a radio device 5, connected to said second cell and able to detect said first cell 4a, to transmit the radio signal using a set of scheduling parameters. The network node is also operative to provide information about how to receive the radio signal based on said set of scheduling parameters to a first base station 2a providing the first cell 4a.

Figure 2B:
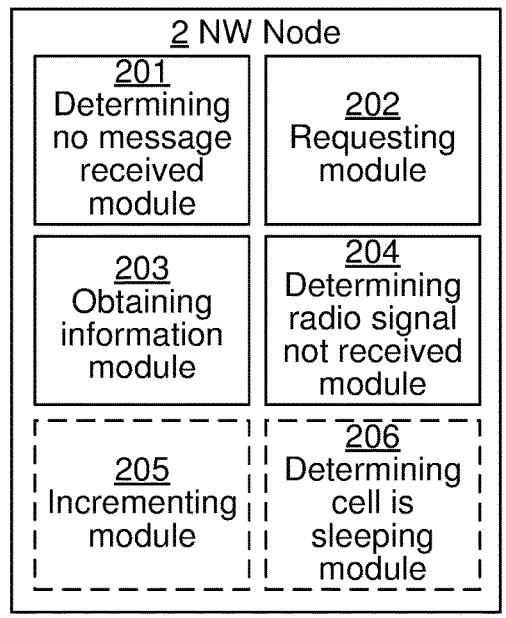
FIG. 2b is a schematic functional block diagram of an embodiment of a NW node in accordance with the present disclosure.

FIG. 2b is a schematic block diagram functionally illustrating an embodiment of a NW node 2 in FIG. 2a. As previously mentioned, the processor circuitry 21 may run software 31 for enabling the NW node 2 to perform an embodiment of a method of the present disclosure, whereby functional modules may be formed in NW node 2 e.g. in the processor circuitry 21 for performing the different steps of the method. These modules are schematically illustrated as blocks within the NW node 2. Thus, the NW node 2 comprises a determining no message received module 201 for determining that no indicative radio message has been received from any radio device 5 during a predetermined time period. The NW node 2 also comprises a requesting module 202 for, in view of said determining, requesting a second cell 4b, 4c or 4d, neighbouring the first cell 4a, to instruct each of at least one radio device 5, connected to said second cell and able to detect said first cell, to transmit a radio signal. The NW node 2 also comprises an obtaining information module 203 for obtaining information about how to receive the radio signal. The NW node 2 also comprises a determining radio signal not received module 204 for determining that the radio signal was not successfully received by the first cell 4a in accordance with the obtained information. In some embodiments, the NW node 2 also comprises an incrementing module 205 for incrementing a counter in response to the determining that the radio signal was not successfully received. Additionally, in some embodiments, the NW node 2 comprises a determining cell is sleeping module 206 for determining that the first cell 4a is a sleeping cell with regard to uplink radio signalling when the counter has reached a predetermined value.

Thus, according to an aspect of the present disclosure, there is provided a network node 2 for a cellular communication network 1. The network node is configured for establishing that a first cell 4a of said network is unable to receive uplink radio signals. The network node comprises means 201 for determining S1 that no indicative radio message has been received from any radio device during a predetermined time period. The network node also comprises means 202 for, in view of said determining S1, requesting S2 a second cell 4b, 4c or 4d, neighbouring the first cell 4a, to instruct each of at least one radio device 5, connected to said second cell and able to detect said first cell, to transmit a radio signal. The network node also comprises means 203 for obtaining S3 information about how to receive the radio signal. The network node also comprises means 204 for determining S4 that the radio signal was not successfully received by the first cell 4a in accordance with the obtained S3 information.

Figure 2C:
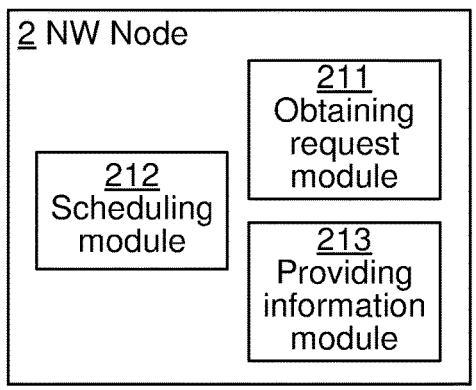
FIG. 2c is a schematic functional block diagram of another embodiment of a NW node in accordance with the present disclosure.

FIG. 2c is a schematic block diagram functionally illustrating another embodiment of a NW node 2 in FIG. 2a. As previously mentioned, the processor circuitry 21 may run software 31 for enabling the NW node 2 to perform an embodiment of a method of the present disclosure, whereby functional modules may be formed in NW node 2 e.g. in the processor circuitry 21 for performing the different steps of the method. These modules are schematically illustrated as blocks within the NW node 2. Thus, the NW node 2 comprises an obtaining request module 211 for obtaining a request for a second cell 4b, 4c or 4d, neighbouring a first cell 4a, to instruct each of at least one radio device 5, connected to said second cell and able to detect said first cell, to transmit a radio signal. The NW node 2 also comprises a scheduling module 212 for scheduling a radio device 5, connected to said second cell and able to detect said first cell, to transmit the radio signal using a set of scheduling parameters. The NW node 2 also comprises a providing information module 213 for providing information about how to receive the radio signal based on said set of scheduling parameters to a first base station 2a providing the first cell 4a.

Thus, according to another aspect of the present disclosure, there is provided a network node 2 for a cellular communication network 1. The network node comprises means 211 for obtaining S11 a request for a second cell 4b, 4c or 4d, neighbouring a first cell 4a, to instruct each of at least one radio device 5, connected to said second cell and able to detect said first cell, to transmit a radio signal. The network node also comprises means 212 for scheduling S12 a radio device 5, connected to said second cell and able to detect said first cell, to transmit the radio signal using a set of scheduling parameters. The network node also comprises means 213 for providing S13 information about how to receive the radio signal based on said set of scheduling parameters to a first base station 2a providing the first cell 4a.

FIG. 2d schematically illustrates an embodiment of a radio device 5 of the present disclosure. The radio device 5 comprises processor circuitry 25 e.g. a central processing unit (CPU). The processor circuitry 25 may comprise one or a plurality of processing units in the form of microprocessor(s). However, other suitable devices with computing capabilities could be comprised in the processor circuitry 25, e.g. an application specific integrated circuit (ASIC), a field programmable gate array (FPGA) or a complex programmable logic device (CPLD). The processor circuitry 25 is configured to run one or several computer program(s) or software (SW) 31 (see also FIG. 3) stored in a storage 26 of one or several storage unit(s) e.g. a memory. The storage unit is regarded as a computer readable means 32 (see FIG. 3) as discussed herein and may e.g. be in the form of a Random Access Memory (RAM), a Flash memory or other solid state memory, or a hard disk, or be a combination thereof. The processor circuitry 25 may also be configured to store data in the storage 26, as needed. The radio device 5 also comprises a communication interface 27 for communication with other nodes, typically with base stations, in the network 1. The communication interface 27 comprises a radio transceiver 28 for radio communication with base stations 2. The radio transceiver comprises transmitter functionality as well as receiver functionality and is associated with an antenna for transmitting and receiving radio signals.

The radio device 5 may be any device or user equipment (UE), mobile or stationary, enabled to communicate over a radio channel in a communication network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

FIG. 3 illustrates a computer program product 30. The computer program product 30 comprises a computer readable medium 32 comprising a computer program 31 in the form of computer-executable components 31. The computer program/computer-executable components 31 may be configured to cause a NW node 2, e.g. as discussed herein, to perform an embodiment of a method of the present disclosure. The computer program/computer-executable components may be run on the processor circuitry 21 of the node 2 for causing the node to perform the method. The computer program product 30 may e.g. be comprised in a storage unit or memory 22 comprised in the node 2 and associated with the processor circuitry 21. Alternatively, the computer program product 30 may be, or be part of, a separate, e.g. mobile, storage means, such as a computer readable disc, e.g. CD or DVD or hard disc/drive, or a solid state storage medium, e.g. a RAM or Flash memory.

FIG. 4a is a schematic flow chart of an embodiment of a method of the present disclosure. The method may be performed by a RAN node 2 such as a base station or an RNC, or a combination thereof, e.g. by the first NW node 2a. It is determined S1 that no indicative radio message has been received from any radio device 5 during a predetermined time period. The indicative radio message may be any radio message or a certain, or certain type of, radio message chosen for indicating that the UL reception of the first cell 4a is ok. The indicative message may e.g. be a first, or any, message in a sequence of messages sent by a radio device 5 in a process for connecting to the first cell 4a, or it may be a message indicating that the radio device 5 is connected to the first cell 4a. For instance, logs may be regularly checked to determine whether an indicative message has been received since the last check, or it may be continuously checked in real time. Then, in view of said determining S1, it is requested S2 that a second cell 4b, 4c or 4d, neighbouring the first cell 4a, instructs each of at least one radio device 5, connected to said second cell and able to detect said first cell, to transmit a radio signal. The radio signal may be any radio signal e.g. the probe transmission discussed above or a random signal. The request may e.g. be sent by an eNB or an RNC serving the first cell 4a of the network 1, depending on the communication standard used. Information is then obtained S3, e.g. from an eNB or an RNC serving the second cell, about how to receive the radio signal. In order to receive the radio signal properly, the node 2 serving the first cell 4a needs to know transmission parameters of the radio signal so it knows what to listen for. Then it is determined S4 that the radio signal was not successfully received by the first cell 4a in accordance with the obtained S3 information. If the signal is instead received, the conclusion may be drawn that there is no problem with the UL reception. However, since the signal was not properly received, it may be assumed that there is something wrong with the UL reception of the first cell 4a and it may be determined that the first cell is sleeping or it may be decided to try more times to receive a signal before it is determined that the first cell is sleeping.

FIG. 4b is a schematic flow chart of another embodiment of a method of the present disclosure. The steps of determining S1 that no indicative radio message has been received, requesting S2, obtaining S3 and determining S4 that the radio signal was not successfully received are as discussed in respect of FIG. 4a. In response to the determining S4 that the radio signal was not successfully received, a counter is incremented S5. Then, it may be determined S6 that the first cell 4a is a sleeping cell with regard to uplink radio signalling when the counter has reached a predetermined value. The counter may e.g. be incremented one step for each radio signal it fails to receive, not receiving any radio signal at all there between, and once the counter reaches the predetermined value, an alarm may be sent to the network operator that the cell appears to be sleeping.

In some embodiments of the present disclosure, the indicative radio message is a message indicating that a radio device 5 is connected, or is attempting to connect, to the first cell 4a.

In some embodiments of the present disclosure, the method of FIG. 4a, e.g. of FIG. 4b, is performed by a network node 2 in the form of a first base station 2a, e.g. an evolved Node B, providing the first cell 4a. In some embodiments, the first base station 2a also provides the second cell 4b or 4c. Alternatively, in some embodiments, the requesting S2 comprises sending a message over an X2 interface to a second base station 2b providing the second cell 4d, and the obtaining S3 information comprises receiving a message over said X2 interface from said second base station.

In some embodiments of the present disclosure, the cellular communication network 1 is in accordance with a WCDMA communication standard and the method is performed by a network node 2 in the form of an RNC of the cellular communication network 1.

In some other embodiments of the present disclosure, the predetermined time period is based on a number of Transmission Time Intervals (TTI:s), or on a Recording Output Period (ROP), as further discussed in the examples below.

In some embodiments of the present disclosure, the network 1 is in accordance with an LTE communication standard and the obtained S3 information comprises information about scheduling parameters of the radio signal, such as any or all of: modulation scheme, Physical Resource Block (PRB) allocation, transport block size, Cell Radio Network Temporary Identifier (C-RNTI), Cell ID, radio frame number, sub-frame number, and propagation delay.

In some other embodiments of the present disclosure, the network 1 is in accordance with a WCDMA communication standard and the obtained S3 information comprises information about scheduling parameters of the radio signal, such as any or all of: Cell ID, scrambling code, channelization code, propagation delay, radio frame number, and sub-frame number.

In some embodiments of the present disclosure, the requesting S2 comprises requesting the second cell 4h, 4c or 4d to instruct a plurality of radio devices 5, connected to said second cell and able to detect said first cell 4a, each to transmit a radio signal.

FIG. 5 is a schematic flow chart of an embodiment of another method of the present disclosure. The method may be performed by a RAN node 2 such as a base station or an RNC, or a combination thereof, e.g. by the first or second NW node 2a or 2b serving the second cell. A request for a second cell 4b, 4c or 4d, neighbouring a first cell 4a, to instruct each of at least one radio device 5, connected to said second cell and able to detect said first cell, to transmit a radio signal is obtained S11. Then, a radio device 5, connected to said second cell and able to detect said first cell, to transmit the radio signal is scheduled S12 using a set of scheduling parameters. Information about how to receive the radio signal based on said set of scheduling parameters is provided S13 to a first base station 2a providing the first cell 4a.

In some embodiments of the present disclosure, the method of FIG. 5 is performed by a network node 2 in the form of a base station 2a or 2b, e.g. an evolved Node B, providing the second cell 4b, 4c or 4d. In some embodiments, the base station providing the second cell 4b or 4c is the first base station 2a which also provides the first cell 4a. In some other embodiments, the base station providing the second cell 4d is a second base station 2b. In that case, in some embodiments, the obtaining S11 a request comprises receiving a message over an X2 interface from the first base station 2a, and the providing S13 information comprises sending a message over said X2 interface to said first base station 2a.

In some other embodiments of the present disclosure, the cellular communication network 1 is in accordance with a WCDMA communication standard and the method is performed by a network node 2 in the form of an RNC of the cellular communication network.

EXAMPLE

In this example, embodiments of the present disclosure are discussed with reference to the FIGS. 6a, 6b and 6c.

Figure 6A:
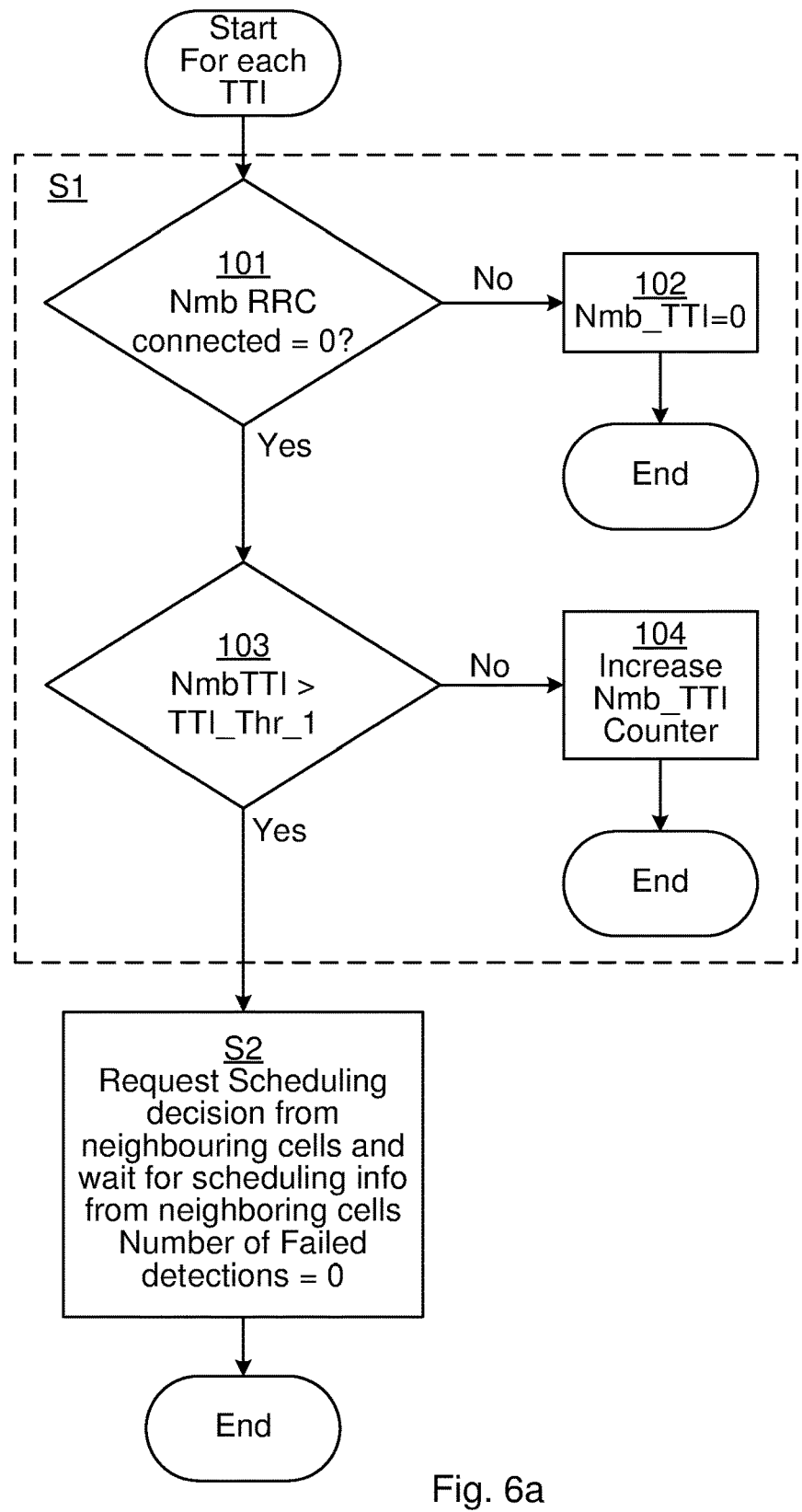
FIG. 6a is a schematic flow chart of a part of an example embodiment of a method in accordance with the present disclosure.

With reference to FIG. 6a, an eNB 2a that receives no Radio Resource Control (RRC) connections in a first cell 4a for a predefined time, defined as number of TTIs, considers the first cell to be a potential sleeping cell (step S1). In more detail, according to this example, it is first checked 101, in each TTI, whether the number of RRC connected radio devices is zero. If not, then the TTI counter is set 102 to zero. However, if the number of RRC connections is zero, then it is checked 103 whether the TTI counter is above a threshold. If not, then the TTI counter is incremented 104 by one step. However, if the TTI counter is above the threshold, the request is sent S2. The eNB 2a then requests S2 a scheduling decision for a probe transmission from one or several neighbouring cells 4b, 4c or 4d and waits for info from neighbouring cells. For instance, a Buffer Status Report on a Physical Uplink Shared Channel (PUSCH) could be used as a probe, but other scheduled uplink transmissions are also possible to use. The request is sent using the X2 interface. If several cells are deployed in the same eNB 2a any internal communication link may be used. Instead using TTI as time interval, e.g. ROP, or any other time interval, may be used.

Figure 6B:
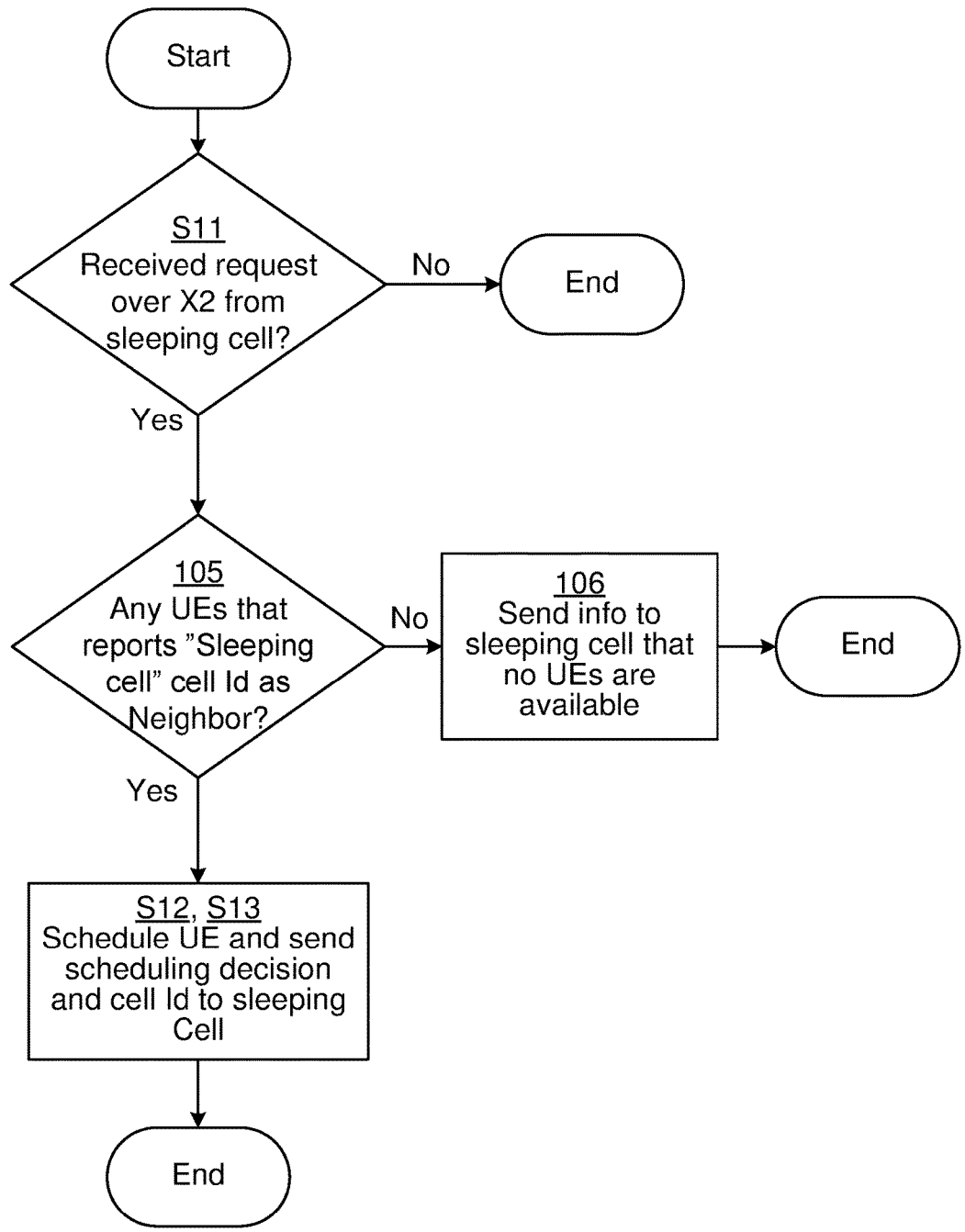
FIG. 6b is a schematic flow chart of another part of the example embodiment of a method in accordance with the present disclosure.

With reference to FIG. 6b, the neighbouring eNB 2b receives S11 a scheduling request for a probe transmission from the potential sleeping cell eNB 2a, after which it performs the following actions:

First it checks 105 if it has any UEs 5 in RRC connected state that report the first cell 4a as a neighbour. If not, the neighbouring eNB 2b sends 106 information to the first eNB 2a that no UE 5 is available. If yes, we assume that the radio channel is reciprocal i.e. if the UE 5 is able to hear the first cell 4a, then the eNB 2a will also be able to hear the UE. This is always the case for time division duplex (TDD) and in most cases for frequency division duplex (FDD).

If the neighbouring eNB 2b finds a UE 5 that reports the first cell 4a as a neighbour, it will schedule S12 the UE and send S13 the scheduling info e.g. scheduling parameters such as, cell id, the UEs RNTI, SFN and sub frame number for the air time when the scheduling will be done to the first cell eNB 2a.

Figure 6C:
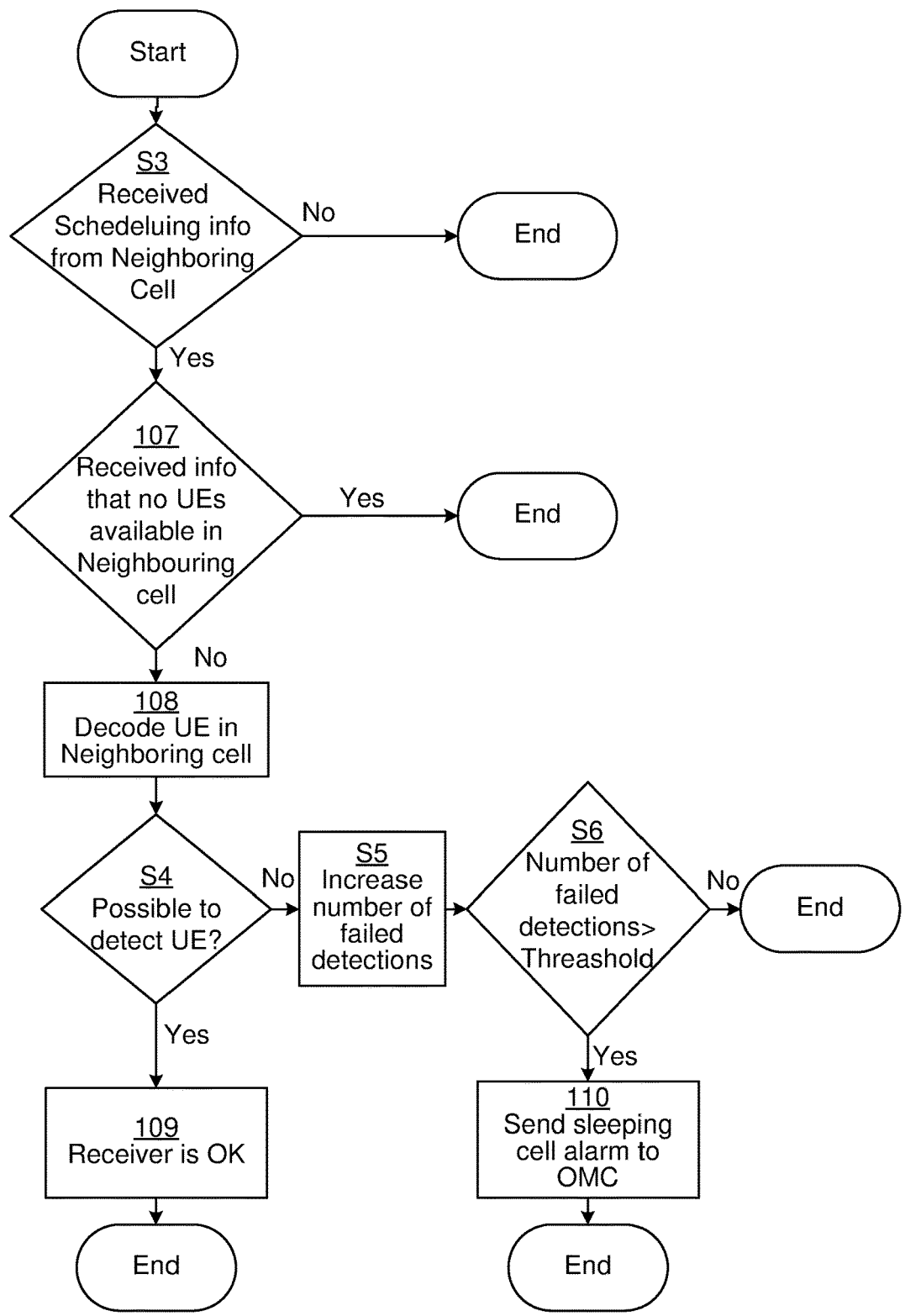
FIG. 6c is a schematic flow chart of another part of the example embodiment of a method in accordance with the present disclosure.

With reference to FIG. 6c, when the first cell 4a eNB 2a receives S3 the scheduling info from the neighbouring cell eNB 2b, and has not received 107 information that no UE 5 is available, the first eNB 2a tries to decode 108 the data sent from the UE 5. If this is possible, it is determined that the signal was successfully received and then that it is possible to detect the UE and the uplink is regarded 109 as fully functional. Otherwise, if decoding is not successful, it is determined S4 that the signal was not successfully received and the UE 5 is not detected, and then a counter is incremented S5. If the number of consecutive decoding failures is determined S6 to have reached a predefined threshold, then the uplink is considered faulty and an alarm is sent 110 to the OMC. End of the example.

The present disclosure provides a way of detecting sleeping cells in an LTE, or other, network for the case when the malfunction is restricted to the uplink reception. Embodiments of the present disclosure may be especially useful in LTE or WCDMA since it is relatively easy for an eNB or Node B to listen to transmissions in neighbouring cells since all cells are typically transmitting on the same frequency. The present disclosure describes an automatic supervision function in which an eNB 2a with potential sleeping cell 4a requests at least one neighbouring eNB 2b UE 5 to transmit to the potentially sleeping cell 4a. Repeated detection failures serve as an indicator that the potentially sleeping cell 4a has a malfunctioning uplink.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a cellular communication network for establishing that a first cell of said network is unable to receive uplink radio signals, the method comprising:
   determining that no indicative radio message has been received at the first cell from any radio device during a predetermined time period;
   in view of said determining no indicative radio message has been received at the first cell, requesting a second cell, neighbouring the first cell, to instruct at least one radio device, connected to said second cell and able to detect said first cell, to transmit a radio signal in the first cell;
   obtaining information from the second cell about how to receive the radio signal in the first cell from the at least one radio device; and
   determining that the radio signal was not successfully received by the first cell in accordance with the obtained information to indicate that the first cell is unable to receive the uplink radio signals.

2. The method of claim 1, wherein the indicative radio message is a message indicating that a radio device is connected, or is attempting to connect, to the first cell.

3. The method of claim 1, wherein the method is performed by a network node in a form of a first base station providing the first cell.

4. The method of claim 3, wherein the first base station also provides the second cell.

5. The method of claim 3, wherein the requesting comprises sending a message over an X2 interface to a second base station providing the second cell, and the obtaining information comprises receiving a message over said X2 interface from said second base station.

6. The method of claim 1, wherein the cellular communication network is in accordance with a Wideband Code Division Multiple Access (WCDMA) communication standard and the method is performed by a network node in a form of a Radio Network Controller (RNC) of the cellular communication network.

7. The method of claim 1, wherein the predetermined time period is based on a number of Transmission Time Intervals (TTIs) or on a Recording Output Period (ROP).

8. The method of claim 1,
   wherein the network is in accordance with a Long Term Evolution (LTE) communication standard and the obtained information comprises information about scheduling parameters of the radio signal that is at least one of: modulation scheme; Physical Resource Block (PRB) allocation; transport block size; Cell Radio Network Temporary Identifier (C-RNTI); Cell ID; radio frame number; sub-frame number; and propagation delay; or
   wherein the network is in accordance with a Wideband Code Division Multiple Access (WCDMA) communication standard and the obtained information comprises information about scheduling parameters of the radio signal that is at least one of: Cell ID; scrambling code; channelization code; propagation delay; radio frame number; and sub-frame number.

9. The method of claim 1, wherein the requesting comprises requesting the second cell to instruct a plurality of radio devices, connected to said second cell and able to detect said first cell, to transmit a radio signal.

10. The method of claim 1, further comprising:
incrementing a counter in response to the determining that the radio signal was not successfully received; and
determining that the first cell is a sleeping cell with regard to uplink radio signalling when the counter has reached a predetermined value.

11. A network node for a cellular communication network, configured for establishing that a first cell of said network is unable to receive uplink radio signals, the network node comprising:
processor circuitry; and
a storage unit storing instructions executable by said processor circuitry, in which the instructions, when executed by said processor circuitry, cause said network node to perform operations to:
determine that no indicative radio message has been received at the first cell from any radio device during a predetermined time period;
in view of determining that no indicative radio message has been received at the first cell, request a second cell, neighbouring the first cell, to instruct at least one radio device, connected to said second cell and able to detect said first cell, to transmit a radio signal in the first cell;
obtain information from the second cell about how to receive the radio signal in the first cell from the at least one radio device; and
determine that the radio signal was not successfully received by the first cell in accordance with the obtained information to indicate that the first cell is unable to receive the uplink radio signals.

12. A method performed in a cellular communication network, the method comprising:
obtaining a request for a second cell, neighbouring a first cell, to instruct at least one radio device, connected to said second cell and able to detect said first cell, to transmit a radio signal in the first cell;
scheduling a radio device, connected to said second cell and able to detect said first cell, to transmit the radio signal in the first cell using a set of scheduling parameters; and
providing information about how to receive the radio signal in the first cell from the radio device, based on said set of scheduling parameters, to a first base station providing the first cell, wherein when the first cell is unable to receive the radio signal, indicating that the first cell is unable to receive uplink radio signals.

13. The method of claim 12, wherein the method is performed by a network node in a form of a base station providing the second cell.

14. The method of claim 13, wherein the base station providing the second cell is the first base station which also provides the first cell.

15. The method of claim 13, wherein the base station providing the second cell is a second base station.

16. The method of claim 15, wherein the obtaining a request comprises receiving a message over an X2 interface from the first base station, and the providing information comprises sending a message over said X2 interface to said first base station.

17. The method of claim 12, wherein the cellular communication network is in accordance with a Wideband Code Division Multiple Access (WCDMA) communication standard and the method is performed by a network node in a form of a Radio Network Controller (RNC) of the cellular communication network.

18. A network node for a cellular communication network, the network node comprising:
processor circuitry; and
a storage unit storing instructions executable by said processor circuitry, in which the instructions, when executed by said processor circuitry, cause said network node to perform operations to:
obtain a request for a second cell, neighbouring a first cell, to instruct at least one radio device, connected to said second cell and able to detect said first cell, to transmit a radio signal in the first cell;
schedule a radio device, connected to said second cell and able to detect said first cell, to transmit the radio signal in the first cell using a set of scheduling parameters; and
provide information about how to receive the radio signal in the first cell from the radio device, based on said set of scheduling parameters to a first base station providing the first cell, wherein when the first cell is unable to receive the radio signal, indicating that the first cell is unable to receive uplink radio signals.

19. A non-transitory computer readable storage medium containing computer-executable components, which when run on processor circuitry of a network node, cause the network node to perform operations for establishing that a first cell of a cellular communication network is unable to receive uplink radio signals, the operations comprising:
determining that no indicative radio message has been received at the first cell from any radio device during a predetermined time period;
in view of said determining no indicative radio message has been received at the first cell, requesting a second cell, neighbouring the first cell, to instruct at least one radio device, connected to said second cell and able to detect said first cell, to transmit a radio signal in the first cell;
obtaining information from the second cell about how to receive the radio signal in the first cell from the at least one radio device; and
determining that the radio signal was not successfully received by the first cell in accordance with the obtained information to indicate that the first cell is unable to receive the uplink radio signals.

20. The non-transitory computer readable storage medium of claim 19, wherein the computer-executable components, which when run on the processor circuitry, cause the network node to perform operations in the cellular communication network in accordance with a Wideband Code Division Multiple Access (WCDMA) communication standard and performed by the network node in a form of a Radio Network Controller (RNC) of the cellular communication network.

21. The non-transitory computer readable storage medium of claim 19, wherein the computer-executable components, which when run on the processor circuitry, cause the network node to perform operations in the cellular communication network in accordance with a Long Term Evolution (LTE) communication standard and in which the obtained information comprises information about scheduling parameters of the radio signal that is at least one of: modulation scheme; Physical Resource Block (PRB) allocation; transport block size; Cell Radio Network Temporary Identifier (C-RNTI); Cell ID; radio frame number; sub-frame number; and propagation delay; or
wherein the computer-executable components, which when run on the processor circuitry, cause the network node to perform operations in the cellular communication network in accordance with a Wideband Code Division Multiple Access (WCDMA) communication standard and in which the obtained information comprises information about scheduling parameters of the radio signal that is at least one of: Cell ID; scrambling code; channelization code; propagation delay; radio frame number; and sub-frame number.

22. The non-transitory computer readable storage medium of claim 19, wherein the computer-executable components, which when run on the processor circuitry, cause the network node to further perform operations comprising:

incrementing a counter in response to the determining that the radio signal was not successfully received; and determining that the first cell is a sleeping cell with regard to uplink radio signalling when the counter has reached a predetermined value.

23. A non-transitory computer readable storage medium containing computer-executable components, which when run on processor circuitry of a network node, cause the network node to perform operations for a cellular communication network, comprising:

obtaining a request for a second cell, neighbouring a first cell, to instruct at least one radio device, connected to said second cell and able to detect said first cell, to transmit a radio signal in the first cell;

scheduling a radio device, connected to said second cell and able to detect said first cell, to transmit the radio signal in the first cell using a set of scheduling parameters; and providing information about how to receive the radio signal in the first cell from the radio device, based on said set of scheduling parameters, to a first base station providing the first cell, wherein when the first cell is unable to receive the radio signal, indicating that the first cell is unable to receive uplink radio signals.

24. The non-transitory computer readable storage medium of claim 23, wherein the computer-executable components, which when run on the processor circuitry, cause the network node in the cellular communication network to perform in accordance with a Wideband Code Division Multiple Access (WCDMA) communication standard and in which the network node is in a form of a Radio Network Controller (RNC) of the cellular communication network.

* * * * *